F. HELMICK.
CAR WHEEL BEARING.
APPLICATION FILED APR. 9, 1918.
1,286,619.
Patented Dec. 3, 1918.
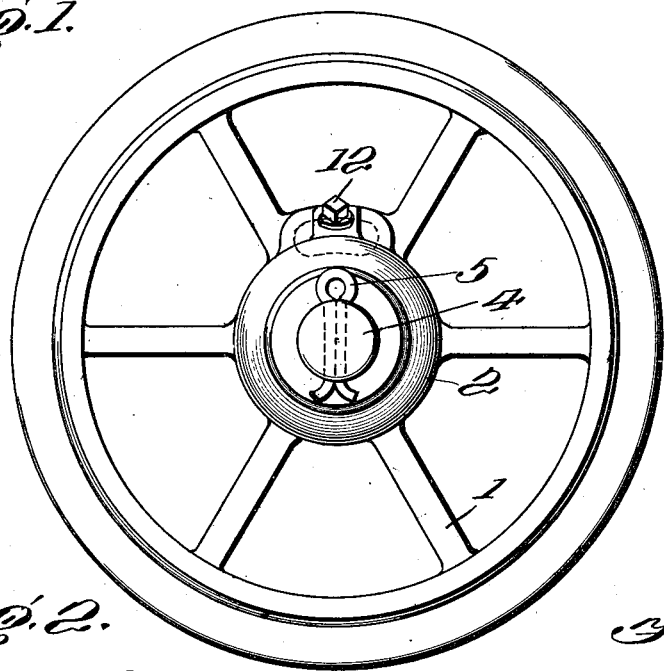
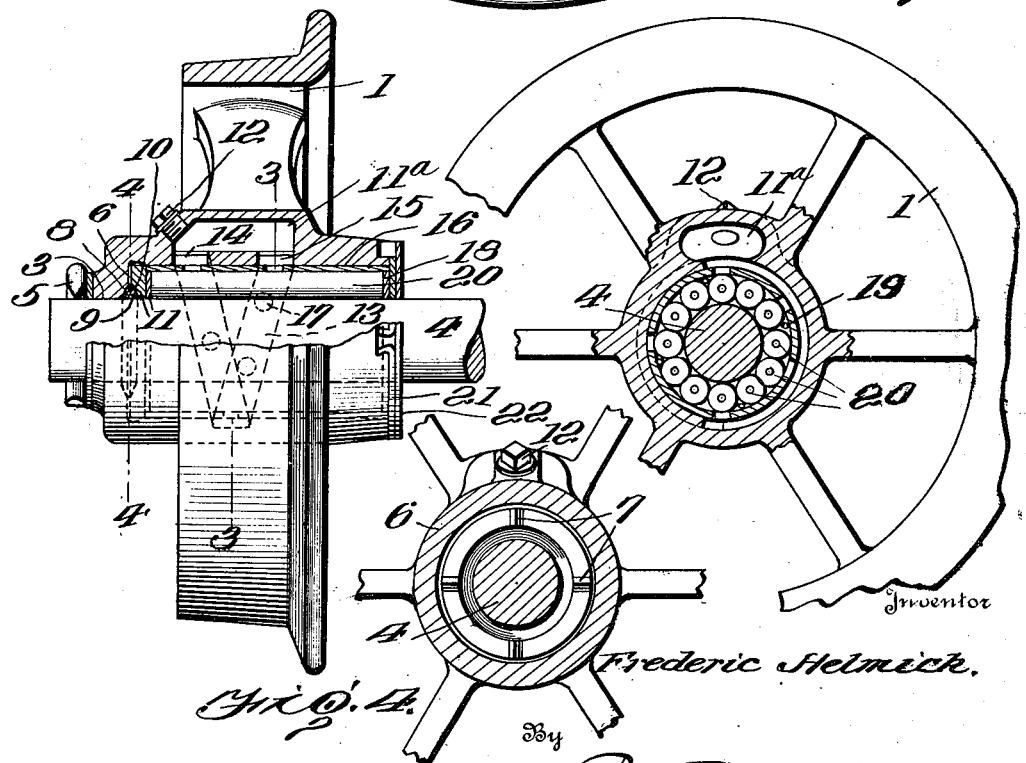

UNITED STATES PATENT OFFICE.

FREDERIC HELMICK, OF FAIRMONT, WEST VIRGINIA, ASSIGNOR TO HELMICK FOUNDRY MACHINE COMPANY, OF FAIRMONT, WEST VIRGINIA, A CORPORATION OF WEST VIRGINIA.

CAR-WHEEL BEARING.

1,286,619.     Specification of Letters Patent.     Patented Dec. 3, 1918.

Application filed April 9, 1918. Serial No. 227,535.

*To all whom it may concern:*

Be it known that I, FREDERIC HELMICK, a citizen of the United States, residing at Fairmont, in the county of Marion and State of West Virginia, have invented certain new and useful Improvements in Car-Wheel Bearings, of which the following is a specification, reference being had therein to the accompanying drawing.

This invention relates to certain new and useful improvements in car wheel construction and more particular to the bearing therefor, the object being to provide a car wheel bearing in which the ordinary construction of roller bearing cage can be employed in order to produce a construction of bearing having novel means for preventing end thrust and for lubricating the same.

Another and further object of the invention is to provide a construction of wheel in which the hub is provided with an annular inclined face against which is arranged a fibrous packing ring, which is engaged by the annular inclined face of a ring in order to hold the packing under compression so as to prevent the waste of lubricant.

Another and further object of the invention is to provide a wheel construction with a chamber to receive lubricant, having the ends of a spiral groove communicating therewith in such a manner that the roller bearings will be thoroughly lubricated.

Other and further objects and advantages of the invention will be hereinafter set forth and the novel features thereof defined by the appended claims.

In the drawings:

Figure 1 is an end elevation of my improved construction of car wheel.

Fig. 2 is a longitudinal vertical section.

Fig. 3 is a section taken on line 3—3 of Fig. 2; and

Fig. 4 is a section taken on line 4—4 of Fig. 2.

Like numerals of reference refer to like parts in the several figures of the drawing.

In carrying out my invention, I employ a wheel body 1 which is provided with a hub 2 having a bore 3 to receive the axle 4 which is secured in position thereon by an ordinary cotter pin 5.

The bore of the hub 3 is annularly enlarged to provide a bearing receiving chamber and to form an abutment 6 which is provided with radial ribs 7. The abutment 6 thus formed is provided with an annular inclined face 8 against which is arranged a packing ring 9 which is engaged by the inclined face 10 of a ring 11, so as to hold the fibrous packing ring under compression in a substantially V-shaped chamber formed by the two inclined faces provides a pocket for the ring. The longitudinal movement of the ring 11$^a$ is limited by the rib 7.

The hub 2 of the wheel body is provided with a chamber 11$^a$ having a plug closed opening 12 through which lubricant is adapted to be forced, and the circumferential enlarged bore of the hub is provided with a spiral groove 13, one end of which communicates with the chamber 11$^a$ at 14 and the other end at 15, in order to cause the lubricant to circulate through the passage formed by the groove.

Arranged within the enlarged portion of the bore of the hub is a bearing cage 16 which is preferably formed of a tubular split casing which fits snugly within the bore, having a series of openings 17 registering with the spiral groove 13. Arranged within the ends of the tubular casing are ring members 18 connected together by rods 19 and provided with bearings 20. The particular construction of roller bearing cage herein shown is well known in the art, and forms no part of this invention, as the only change in construction is the openings in the casing registering with the oil passage, and while I have shown a particular construction of roller bearings, it is, of course, understood that any form of roller bearing could be used provided the same was composed of a tubular cage in order that apertures could be formed therein to register with the lubricating passage.

The end of the bearing cage engages the ring 11 as clearly shown in Fig. 2, so that the ring will be forced against the packing ring so that the packing ring will be held in close contact with the axle in order to prevent the lubricant from passing out through the outer end of the hub.

The bearing cage is held within the hub by a bearing retaining member 21 constructed as shown in my companion application executed even date herewith, the same being protected by a washer 22.

From the foregoing description it will be seen that I have provided a car wheel construction having means for lubricating the roller bearings in such a manner that the lubricant is fed to the bearings as it is consumed, whereby an economical bearing is produced as all waste of lubricant is eliminated.

I claim:

1. A car wheel having a hub provided with a bore at its outer end to receive an axle, said bore being annularly enlarged at its inner end to form a shoulder, said shoulder having an annular inclined face, a packing ring arranged against said face, a ring having an inclined face arranged against said packing ring, a bearing cage arranged within the enlarged bore of said hub in contact with said ring, and means for securing said bearing cage within said hub.

2. A car wheel having a hub provided with a bore at its outer end to receive an axle, said hub having an internal annular inclined face, a packing ring arranged against said face, a compression ring having an inclined face arranged against said packing ring, and a bearing cage arranged within haid hub and means for holding said bearing cage within said hub against said compression ring.

3. A car wheel having a hub provided with a bore at its outer end to receive an axle, said bore being enlarged to form a shoulder, said shoulder being provided with an annular inclined face and radial ribs, a packing ring arranged against the inclined face of said shoulder surrounding said axle, a compression ring having an inclined face engaging said packing ring, and a bearing cage secured within said hub in engagement with said compression ring.

4. A car wheel provided with a hub having a roller bearing receiving chamber, a member movably mounted in said hub having a reduced portion, said hub having a reduced portion forming with the reduced portion of said member, a substantially V-shaped chamber, a packing ring arranged therein, and a bearing cage arranged within said bearing receiving chamber against said member.

5. A car wheel having a hub provided with a roller bearing having an apertured cage, an oil or grease reservoir formed in said hub, a spiral groove formed in said hub having its ends communicating with said reservoir and a packing ring arranged within said hub to one side of said groove.

6. A car wheel having a hub provided with a bore to receive a roller bearing cage, a reservoir formed in said hub, a spiral groove formed in said bore having its ends communicating with said reservoir, a bearing cage mounted within said bore having a tubular casing provided with apertures registering with said groove, and means for securing said bearing cage within said bore.

7. The combination with an axle, of a wheel having a hub provided with a bore to receive said axle, said bore being enlarged for a greater portion of its length forming a shoulder at one end thereof, said shoulder having an inclined face, a packing ring arranged against said inclined face, a compression ring having an inclined face engaging said packing ring, the enlarged portion of said bore being provided with a spiral groove, a reservoir communicating with the ends of said groove and a bearing cage mounted within said bore having a casing provided with openings registering with the groove thereof.

8. A car wheel having a hug provided with a bore to receive an axle and an annular chamber to receive a roller bearing cage, said bearing receiving chamber being provided with a groove, a reservoir communicating with the ends of said groove, a bearing cage having a tubular casing mounted within said bore provided with openings registering with said groove, a compression ring arranged within said hub engaging the inner end of said bearing cage, and a packing ring engaged by said compression ring.

9. The combination with an axle, of a wheel having a hub provided with a bore at its outer end to snugly fit said axle, said bore being enlarged to produce a shoulder, said shoulder having an annular inclined face and radial abutment ribs extending into a plane beyond the inclined face thereof, a packing ring surrounding said axle in contact with the inclined face of said shoulder, a compression ring having an inclined face in contact with said packing ring, a roller bearing cage arranged within said bore having its inner end in engagement with said compression ring and a locking plate secured to said hub in engagement with the outer end of said bearing cage.

10. A car wheel having a hub provided with a reservoir, a spiral groove formed in the bore of said hub having its ends in communication with said reservoir, and a roller bearing cage having a casing mounted within said hub, said casing having openings registering with the spiral groove of said bore.

In testimony whereof I hereunto affix my signature in the presence of two witnesses.

FREDERIC HELMICK.

Witnesses:
  W. B. Crowl,
  John P. Jones.